Patented Jan. 25, 1944

2,339,808

UNITED STATES PATENT OFFICE 2,339,808

PROCESS OF TREATING FERROTITAN-IFEROUS MATERIALS

Andreas Johan Ravnestad and Olav Möklebust, Fredrikstad, Norway, assignors to Titan Company Incorporated, Wilmington, Del.

No Drawing. Application February 6, 1941, Serial No. 377,668. In Norway March 16, 1940

7 Claims. (Cl. 23—200)

This invention relates to the treatment of ferro-titaniferous materials to increase the titanium concentration thereof. More particularly, it relates to a process for removing iron from titaniferous materials and for the preparation of titanium oxide concentrates.

The principal raw material containing titanium compounds is ilmenite of which several different types are known. Ilmenite occurs in many rocks and sands and this mineral is considered to consist mainly of iron titanates of different composition. Most ilmenite concentrates on the market contain usually between 30% and 60% $TiO_2$ and have undergone a mechanical ore dressing operation including wet separation of gangue and magnetic separation of minerals more or less magnetic than ilmenite.

Ilmenite concentrates obtained by mechanical operations often show the highest $TiO_2$ content which can be practically reached without resorting to chemical or metallurgical treatments. As, however, the iron content of the commercial ilmenites is rather high, usually between 25% and 40% Fe in the ilmenite, or between 40% and 80% calculated on the $TiO_2$ content, it will be realised that removal of a considerable part of the iron in an economical manner is a problem of importance.

Several methods for the extraction of the iron contained in ferro-titaniferous ores have been proposed as, for instance, methods consisting in treatment of ilmenite with strong acids or alkalis, but these processes are not considered to be economical in the production of $TiO_2$-concentrates for industrial purposes.

It has also been proposed to heat ferro-titanium ores in oxidizing or reducing atmosphere whereby the ores are rendered more adaptable to a subsequent extraction of the iron with dilute acids or solutions of salts or of other reactive agents. However, these processes have attained no technical importance because of the comparatively high expenses involved in the consumption of the required chemicals and also because of the complicated equipment required for such operations.

It has further been proposed to treat ferrotitanium ores by a thermal reduction process coupled with a subsequent mechanical separation of the metallic iron from the titaniferous material.

An object of the present invention is to remove the iron from ferro-titaniferous ores in a much simpler way, involving less expenses than hitherto known.

In accordance with the present invention a process is provided of treating ferro-titaniferous materials to increase the titanium concentration thereof, which comprises reducing iron compounds therein to the metallic state, oxidizing the metallic iron, and removing resulting iron-oxygen compounds from the residual titanium concentrate.

In carrying out the process of the invention in practice it may be divided into the following steps:

(a) Thermal reduction of ore under conditions which convert iron into metallic state in a finely divided form.

(b) Conversion of the metallic iron into oxide compounds by a suitable oxidizing treatment, preferably by action of air in the presence of water or steam or both.

(c) Removal of the iron oxide compounds from the other components by washing, magnetic treatment or in other ways.

The thermal reduction may be carried out in such a way that the ferro-titanium ore, for instance in form of ilmenite concentrate, is heated to 700°–1100° C. in a reducing atmosphere. If gases such as hydrogen, carbon monoxide, coal gas, water gas, are used as reducing agents, the reduction proceeds fairly well at 700°–900° C. If solid reducing agents such as charcoal are used, the crushed ferro-titanium ore is mixed with the reducing agent and the mixture is heated to a temperature somewhat higher than when gaseous reduction is applied, the preferable temperature being dependant upon the working conditions and the quality of the ore.

When using solid reducing agents, enough should preferably be used so that a surplus of same is left in the finished reduced product. The reduction in stationary retorts requires generally a larger surplus of reducing agent than reduction in rotary kilns.

The discharge from the reduction kiln should be cooled under such conditions that reoxidation is avoided and the reduced material should not undergo changes which render it less reactive during the subsequent oxidation process. A quick cooling process is preferred.

The reduced material may be stored for months without losing its reactivity when it is kept under dry conditions.

To what extent the iron content should be reduced to metallic state, is dependant upon the quantity of iron oxides which is to be removed. In many cases it is sufficient to reduce only one half of the total iron contained in the ore and a considerable increase of the titanium content may be obtained even by removal of less of this iron. In order to get a concentrate exceptionally rich in $TiO_2$ containing, for instance, 75–85% $TiO_2$, most of the iron should be reduced but it is seldom necessary to reduce more than 90–95% of the total iron, and this facilitates the reduction process to a great extent.

The oxidation of the metallic iron is preferably carried out by the action of air in combination with water or steam or both under controlled conditions. The temperature of the charge is easily regulated by adjusting the quantities of air, water and steam introduced.

Addition of water should be made in such a way that the whole mass is thoroughly wetted but without introduction of surplus water beyond this point. Air (or other oxidizing gases) should be in contact with the mass but the oxidation should not be so intense that a water-poor ferric oxide ($Fe_2O_3$) or rusty products are formed which are difficult to separate from the titaniferous material by a simple washing operation, or a magnetic treatment.

The exact composition of the iron oxides which are more or less hydrated is not quite clear, but their appearance and consistency are characteristic, and it is easy to control the oxidation operation so as to obtain products with the desired properties. Generally the colour of the iron oxides should be dark, similar to $Fe_3O_4$ with no noteworthy traces of red or yellow iron hydrates. During the oxidation the volume of the mass increases, whereby the mass becomes looser and acquires an appearance similar to moist dark earth.

If the oxidation is carried out under too dry conditions or at too high temperatures, a film of oxidised iron may be formed on the surface of the metallic iron and retard the oxidation process.

Some times it is preferred to interrupt the oxidation before all the iron is oxidized, thus obtaining a product with, for instance, up to 5% Fe in metallic form.

Experiments have proved that the oxidation of the iron may be considerably accelerated by using additions of electrolytes, such as NaCl, $MgCl_2$, $Ca(NO_3)_2$, HCl, $HNO_3$, etc. Also the presence of $CO_2$ or $CO_2$-containing gases accelerates the oxidation of the metallic iron to a considerable extent.

Also other oxidizing agents may be used alone or in combination with air. Thus acids and salts developing oxygen may be used, for instance, nitric acid, nitrates, chlorates, perchlorates.

When the oxidation is carried out in steps, it has in many cases proved an advantage to use air in one or more steps and acids or salts developing oxygen in the subsequent steps.

Furthermore, the temperature has proved to be of great importance in the oxidation operation. For some of the reduced ilmenites the oxidation proceeds rapidly at 60°–80° C., but even as low a temperature as 20° may be sufficient to maintain the oxidation. A temperature of above 100° C. may also be used as it has been found that water or steam introduced into the charge at such high temperature is partially absorbed by the material, giving hydrated iron oxides and accelerating the oxidation. Temperatures of above 200° C. will generally not allow sufficient water to combine with the iron oxides and will result in iron oxides which are dry and hard and make the separation of these oxides by washing difficult.

Experiments have shown that the heat of oxidation may be utilised advantageously in the oxidation process.

It has been found that during the oxidation it is not necessary to keep the mass in motion, but moving the mass either occasionally or continuously will accelerate the oxidation process. The oxidation may be carried out in one or more steps dependent upon the material and the apparatus used.

When the oxidation operation has reached the desired degree the iron oxides may be separated from the titanium concentrate by subjecting the charge to a strong agitation in presence of water or by some sort of motion which causes the particles to rub or grind against each other. This operation may be carried out in rotary drums, ore classifiers or other suitable apparatus. After such operation the iron oxides are easily suspended in water and separated from the titanium concentrate by washing and decantation. The iron oxides in suspension will easily settle when left in settling tanks, and are filtered and dried.

They form a soft, finely divided, uniform product valuable as raw material in the production of iron oxide pigments and other iron compounds. The product is also of value in the production of iron, steel and ferro-alloys. Analysis of the iron oxides has shown 65%–70% Fe dependent upon the temperature of drying or roasting.

The titanium concentrate may be washed, dried or calcined and makes an excellent material for the production of titanium compounds, for metallurgical purposes as well as for the production of titanium pigments.

In order to illustrate the invention the following examples are given:

*Example 1*

1000 kilograms of ilmenite concentrate containing 44% $TiO_2$ and 36% Fe and having a grain size of about ½ mm., were mixed with 300 kilograms charcoal and heated in a rotary kiln to 950° C. and kept at this temperature for 1 hour, after which time about 90% of the total iron content had been converted to metallic state. The reduced material was cooled without access of air to about 300° C. and thereafter quenched in water. The surplus of coal was washed away, advantage being taken of the great difference in specific gravity and settling between ore and coal, and the reduced material was dewatered on a rotary filter.

The moist material was then placed in a rotary drum and a small amount of a weak solution of magnesium chloride added. The drum was kept in a slow rotation, and water and steam were introduced under controlled conditions so that the charge was kept within the temperature range of 50–80° C. In the course of about 6 hours the content of metallic iron had been reduced from 36% to 5%, iron oxides having been formed in corresponding quantities. More water was then introduced and the speed of rotation increased, thereby submitting the charge to strong agitation in water. After about 1 hour the iron oxides were in suspension and were removed by decantation and washing. The titanium concentrate was dewatered on a filter and dried. The analysis of the treated material showed that the content of $TiO_2$ had increased from 44% in the original material to 68% in the finished product, and the total content of iron decreased from 36% in the original material to about 16% in the finished product.

Example 2

A titano-magnetite which contained about 20% $TiO_2$, was reduced with hydrogen at 870° C. until about 90% of the iron content had been converted into finely divided metallic iron. The reduced material was quenched in water and dewatered on a filter, whereafter it was treated in the same way as described in Example 1. The oxidation took place in stationary troughs with occasional stirring of the charge.

After removal of the iron oxides by washing, a concentrate was obtained, containing 40% $TiO_2$.

While ilmenite is the principal raw material in the production of titanium compounds at the present time, many other ferro-titaniferous ores may be suitable. Due to the high iron content, however, they have not found commercial application. The present invention permits the removal of iron in a simple and economical manner and will therefore be of value in the application of such ores. The invention is therefore not limited to high class ferro-titaniferous ores like ilmenite concentrates, but also may be applied to ferro-titaniferous ores which are considered to be of less value, if any, at the present time.

In some types of ferro-titaniferous materials it is difficult to reduce under technical conditions more than 90% of the iron to the metallic state in one operation. In such cases practically the total amount of iron may be reduced by effecting the reduction operation in two subsequent steps. Ferro-titaniferous materials in which the iron is combined in forms such as iron silicates which make reduction to the finely divided metallic state difficult, may be subjected to magnetic treatment, electro-flotation or air separation in order to separate out such minerals.

After reduction the surplus of solid reducing material in the charge is removed by washing and recovered by filtration.

By washing the charge in a rotating drum in the presence of an excess of water, the iron oxides formed are suspended and easily separated by decantation, settling and filtration. Hereby the surface of the metallic iron becomes free and the oxidation of the remaining iron may continue.

It is obvious that the process may be interrupted at any time desired and that titanium concentrates with different content of $TiO_2$ may be obtained.

We claim:

1. The process of treating ferro-titaniferous materials which comprises a thermal reduction of iron oxides to metallic state and a subsequent oxidation of the iron at a temperature below 200° C. by means of atmospheric oxygen in combination with water or steam or both, and removal of iron oxides by agitation with water and separation of the suspended iron oxides from the titanium concentrate.

2. Method for the treatment of ferro-titaniferous minerals which comprises calcining a finely divided ferro-titaniferous mineral under reducing conditions until a major portion of the iron content of said mineral is converted to metallic iron, cooling the reduced mineral under non-oxidizing conditions, admixing the reduced mineral with sufficient water to form a wet mass having a temperature not in excess of 200° C., exposing said wet mass to the action of an oxidizing gas to oxidize the metallic iron content of the reduced mineral to iron oxides, maintaining the temperature of the wet mass during the oxidation below 200° C., and separating the resulting iron oxides from the residue containing the titanium constituents of the said mineral.

3. Method for the treatment of ferro-titaniferous minerals which comprises calcining at temperatures between about 800° C. and about 1000° C. a finely divided ferro-titaniferous mineral in contact with a reducing agent until from about 50 percent to about 95 per cent of the iron content of said mineral is converted to metallic iron, cooling the reduced mineral under non-oxidizing conditions, admixing the reduced mineral with sufficient water to form a wet mass having a temperature not in excess of 200° C., exposing said wet mass to the action of an oxidizing gas to oxidize the metallic iron content of the reduced mineral to iron oxides, controlling the resulting exothermic oxidation by regulation of the supply of oxidizing gas so that the temperature of the wet mass does not exceed about 200° C., and separating the resulting iron oxides from the residue containing the titanium constituents of the said mineral.

4. Method for the treatment of ilmenite which comprises calcining ilmenite in a finely-divided state under reducing conditions until a major portion of the iron content of ilmenite is converted to metallic iron, cooling the reduced ilmenite under non-oxidizing conditions, admixing the reduced ilmenite with sufficient water to form a wet mass having a temperature not in excess of 200° C., exposing said wet mass to the action of an oxidizing gas to oxidize the metallic iron content of the reduced ilmenite to iron oxides, maintaining the temperature of the wet mass during the oxidation below 200° C., and separating the resulting iron oxides from the residue containing the titanium constituent of the ilmenite.

5. Method for the treatment of ferri-titaniferous minerals which comprises calcining a finely-divided titano-ferruginous mineral under reducing conditions until a major portion of the iron content of said mineral is converted to metallic iron, cooling the reduced mineral under non-oxidizing conditions, admixing the reduced mineral with sufficient water to form a wet mass having a temperature not in excess of 200° C., exposing said wet mass to the action of an oxidizing gas to oxidize the metallic iron content of the reduced mineral to iron oxides, maintaining the temperature of the wet mass during the oxidation below 200° C., and separating the resulting iron oxides from the residue containing the titanium constituents of the mineral by hydro-separation.

6. Method for the treatment of titano-ferruginous minerals which comprises calcining a finely-divided titano-ferruginous mineral under reducing conditions until a major portion of the iron content of said mineral is converted to metallic iron, cooling the reduced mineral under non-oxidizing conditions, admixing the reduced mineral with sufficient water to form a wet mass having a temperature not in excess of 200° C., exposing said wet mass to the action of an oxidizing gas to oxidize the metallic iron content of the reduced mineral to iron oxides, maintaining the temperature of the wet mass during the oxidation below 200° C., and separating the resulting iron oxides from the residue containing the titanium constituents of the mineral by air-separation.

7. Method for the treatment of titano-ferruginous minerals containing other metal constituents which comprises calcining at temperatures between about 800° C. and about 1000° C. a finely-divided titano-ferruginous mineral in contact with a reducing agent until from about 50 percent to about 95 percent of the iron content of said mineral is converted to metallic iron, cooling the reduced mineral under non-oxidizing conditions, admixing the reduced mineral with sufficient water to form a wet mass having a temperature not in excess of 200° C., exposing said wet mass to the action of an oxidizing gas to oxidize the metallic iron content of the reduced mineral to iron oxides, controlling the resulting exothermic oxidation by regulation of the supply of oxidizing gas so that the temperature of the wet mass does not exceed about 200° C., suspending the oxidized mass in water, agitating the suspension to disengage the iron oxide particles from unoxidized particles, removing the water containing the lighter iron oxide particles from the heavier unoxidized residual titanium-containing particles of the metal.

ANDREAS JOHAN RAVNESTAD.
OLAV MÖKLEBUST.